United States Patent
Hou et al.

(10) Patent No.: US 8,213,414 B2
(45) Date of Patent: Jul. 3, 2012

(54) METHODS, SYSTEMS, AND COMPUTER PROGRAM PRODUCTS FOR PROVIDING TIME DIVISION MULTIPLEXED (TDM) TERMINATING SERVICE IN A PACKET NETWORK

(75) Inventors: Hao Hou, Plano, TX (US); Philip Abraham, Allen, TX (US); Eric Chien-Chung Chang, Plano, TX (US); Heriberto Aguirre, Plano, TX (US)

(73) Assignee: Genband US LLC, Plano, TX (US)

( * ) Notice: Subject to any disclaimer, the term of this patent is extended or adjusted under 35 U.S.C. 154(b) by 831 days.

(21) Appl. No.: 11/358,944

(22) Filed: Feb. 21, 2006

(65) Prior Publication Data

US 2006/0193309 A1 Aug. 31, 2006

Related U.S. Application Data

(60) Provisional application No. 60/654,548, filed on Feb. 18, 2005.

(51) Int. Cl.
*H04B 7/212* (2006.01)
*H04M 11/00* (2006.01)

(52) U.S. Cl. ........... 370/352; 370/442; 379/90.01
(58) Field of Classification Search .......... 370/466, 370/389, 431, 442, 216, 230, 310, 328, 338, 370/352, 395.3, 401; 379/90.01, 93.01, 93.26, 379/93.28, 93.31, 93.05, 93.06, 201.12, 142.17, 379/202.01, 201.02, 207.13, 210.01, 211.02, 379/221.14, 221.01
See application file for complete search history.

(56) References Cited

U.S. PATENT DOCUMENTS

| 6,633,566 | B1 | 10/2003 | Pierson, Jr. | |
| 6,683,877 | B1 * | 1/2004 | Gibbs et al. | 370/395.2 |
| 6,731,627 | B1 * | 5/2004 | Gupta et al. | 370/352 |
| 6,795,437 | B1 * | 9/2004 | Rasanen et al. | 370/395.1 |
| 6,963,561 | B1 * | 11/2005 | Lahat | 370/356 |
| 7,006,489 | B2 * | 2/2006 | Li et al. | 370/352 |
| 7,283,533 | B1 * | 10/2007 | Kumar et al. | 370/395.52 |

(Continued)

OTHER PUBLICATIONS

Notification of Transmittal of the International Search Report and the Written Opinion of the International Searching Authority, or the Declaration for International Application No. PCT/US06/05993 (Aug. 10, 2007).

(Continued)

*Primary Examiner* — Chi Pham
*Assistant Examiner* — Prince A Mensah
(74) *Attorney, Agent, or Firm* — Jenkins, Wilson, Taylor & Hunt, P.A.

(57) ABSTRACT

The subject matter described herein includes methods, systems, and computer program products for providing TDM terminating services in a packet network. According to one method, a combined set including a plurality of TDM channels is received over a packet network. The combined set of TDM channels is terminated in the packet network as a combined TDM facility. Terminating the TDM channels as a combined TDM facility may include providing at least one terminating TDM service for the TDM channels, such as performing CAS signaling or providing a PRI interface for the TDM channels.

30 Claims, 3 Drawing Sheets

U.S. PATENT DOCUMENTS

| | | | |
|---|---|---|---|
| 2001/0017861 A1 | 8/2001 | Allen, Jr. et al. | |
| 2002/0141386 A1* | 10/2002 | Minert et al. | 370/352 |
| 2003/0007495 A1* | 1/2003 | Thune et al. | 370/401 |
| 2003/0053463 A1* | 3/2003 | Vikberg et al. | 370/395.1 |
| 2003/0083988 A1* | 5/2003 | Reith | 705/40 |
| 2003/0123466 A1* | 7/2003 | Somekh et al. | 370/401 |
| 2003/0161345 A1* | 8/2003 | Flowers et al. | 370/468 |
| 2003/0193953 A1* | 10/2003 | Drort et al. | 370/395.1 |
| 2003/0210677 A1* | 11/2003 | Grove et al. | 370/352 |
| 2003/0210679 A1* | 11/2003 | Grove et al. | 370/352 |
| 2004/0022237 A1 | 2/2004 | Elliott et al. | |
| 2004/0081116 A1* | 4/2004 | Clay | 370/321 |
| 2004/0264455 A1* | 12/2004 | Tao | 370/389 |
| 2005/0074017 A1* | 4/2005 | Qian et al. | 370/401 |
| 2005/0085181 A1* | 4/2005 | Tao | 455/1 |
| 2006/0268832 A1* | 11/2006 | Mekala et al. | 370/352 |

OTHER PUBLICATIONS

"Voice and Multimedia Over ATM—Loop Emulation Service Using AAL2," The ATM Forum Technical Committee, AF-VMOA-0145.000, pp. 1-83 (Jul. 2000).

"ATM Trunking Using AAL2 for Narrowband Services," The ATM Forum Technical Committee, AF-VTOA-0113.000, pp. i-vi and 1-52 (Feb. 1999).

"Circuit Emulation Service Interoperability Specification Version 2.0," The ATM Forum Technical Committee, af-vtoa-0078.000 (Jan. 1997).

"Pseudo Wire Emulation Edge to Edge (pwe3) Internet Drafts," http://www.potaroo.net/ietf/ids-wg-pwe3.html, pp. 1-8 (Publication Date Unknown).

* cited by examiner

METHODS, SYSTEMS, AND COMPUTER PROGRAM PRODUCTS FOR PROVIDING TIME DIVISION MULTIPLEXED (TDM) TERMINATING SERVICE IN A PACKET NETWORK

RELATED APPLICATIONS

This application claims the benefit of U.S. Provisional Patent Application Ser. No. 60/654,548, filed Feb. 18, 2005; the disclosure of which is incorporated herein by reference in its entirety.

TECHNICAL FIELD

The subject matter described herein relates to providing TDM services in a telecommunications network. More particularly, the subject matter described herein relates to providing TDM terminating services in a packet network.

BACKGROUND ART

Time-division multiplexing (TDM) is a type of digital multiplexing in which pulses representing bits from different channels are interleaved in time. In telecommunications, T-carrier is the generic designator for any of several TDM telecommunications carrier systems in North America and Japan, while E-carrier system, where 'E' stands for European, is compatible with the T-carrier and is used just about everywhere else in the world.

The designators for T-carrier in digital hierarchy correspond to the designators for digital signal (DS) level hierarchy. For example, a DS-1 is the data carried on a T-1 carrier, and a DS-3 signal is carried on a T3 carrier. The basic unit of the T-carrier system is the DS-0, which has a transmission rate of 64 kbit/s and is commonly used for one voice circuit. A T1 line refers to a combination of data circuits and operates at a 1.544 Mbit/s line rate. The T1 carrier carries 24 pulse-code-modulated, time-division-multiplexed speech channels each encoded in 64 kbit/s streams, leaving 8 kbit/s of framing information which facilitates the synchronization and demultiplexing at the receiver. Similarly, the T3 carries 672 voice channels or 24 DS-1 channels.

Integrated services digital network (ISDN) is an international telecommunications standard for providing a digital service from the customer's premises to the dial-up telephone network. ISDN uses 64 Kbps circuit-switched channels, called "B channels" (bearer channels), to carry voice and data and a separate D channel (delta channel) for control signals. The D channel signals the carrier's voice switch to make calls, put them on hold and activate features, such as conference calling and call forwarding. It also receives information about incoming calls, such as the identity of the caller. Since the D channel connects directly to the telephone system's SS7 signaling network, ISDN calls are connected much faster than regular telephone calls.

ISDN's basic service is basic rate interface (BRI), which is made up of two 64 Kbps B channels and one 16 Kbps D channel (2B+D). If both channels are combined into one, called "binding," the total data rate becomes 128 Kbps and is four and a half times the bandwidth of a V.34 modem (28.8 Kbps). ISDN's high-speed service is primary rate interface (PRI). It provides 23 B channels and one 64 Kbps D channel (23B+D), which is equivalent to the 24 channels of a T1 line. Alternatively, channel associated signaling (CAS) communications may be used in which signaling information is carried within the data channels of a T1 line (in band) rather than on a separate control (D) channel. When several channels are bonded together, high data rates can be achieved. For example, it is common to bond six channels for quality videoconferencing at 384 Kbps.

DS-1 signals are frequently used to connect equipment within a facility. When a DS-1 leaves the building, it becomes a T1 and is referred to as a span. The signal is boosted to a higher level and superimposed on a DC voltage, enabling repeaters in the field to be powered from the span itself. Repeaters are placed every few thousand feet, to clean up and strengthen the signal. DS-3 signals are almost exclusively used within buildings because a T-3 carrier can only go about 600 feet between repeaters. The T-carrier system traditionally uses in-band signaling or bit robbing, resulting in lower transmission rates than the E-carrier system, which lowers the effective data rate to 56 Kbps over a nominal 64 Kbps channel.

As can be appreciated, the use of dedicated T1 (or T2 or T3) lines can be quite costly due to the distance limitations, repeaters required, and the necessity to dedicate specific conductors for exclusive use. In contrast, packet networks are more readily available and less costly to use. It is therefore desirable to carry TDM traffic over a packet network to avoid the costs associated with carrying conventional TDM traffic over a T1 line.

Some solutions have been proposed to carry TDM traffic over a packet network, such as ATM Forum's Circuit Emulation Service (CES) Interoperability Specification, version 2.0, January, 1997. The CES approach, however, is limited to the situation where two separate TDM networks are interconnected by an asynchronous transfer mode (ATM) network, which means the packet network is only relaying the TDM traffic and doesn't actually terminate the TDM traffic. That is, the packet network can't provide TDM related services, and so another TDM network is required. Accordingly, the CES model doesn't work in situations where TDM traffic is sent to a node within an ATM network for termination within the ATM network.

In another solution proposed by IETF, pseudo-wire emulation edge-to-edge (PWE3) employs the same approach as CES, but is not restricted to ATM networks. Internet protocol (IP), multiprotocol label switching (MPLS), FrameRelay, and ATM networks are all supported.

Another solution that allows connection of TDM services in an ATM network is ATM Forum's Voice and Multimedia Over ATM Loop Emulation Service Using AAL2 (LES) Specification, July, 2000. In this solution, the ATM network terminates the TDM service, but it is done per local loop line, i.e., per DS-0. It doesn't support the service on a T1/E1 level, T3/E3 level. Accordingly, it does not act as a T1 line, for example, in all respects.

What is needed is a method for providing TDM terminating service over a packet network that terminates the TDM traffic in the packet network, instead of relaying it to another TDM network, so that TDM terminating services may be provided in the packet network.

SUMMARY

According to one aspect, the subject matter described herein includes a method for providing terminating TDM service in a packet network. The method includes receiving a combined set including a plurality of TDM channels over a packet network. The combined set of TDM channels is terminated in the packet network as a combined TDM facility.

Terminating the channels as a combined TDM facility includes providing at least one terminating TDM service for the channels.

The subject matter described herein can be implemented using a computer program product comprising computer-executable instructions embodied in a computer-readable medium. Exemplary computer-readable media suitable for implementing the subject matter described herein include disk memory devices, chip memory devices, programmable logic devices, and application specific integrated circuits. In addition, a computer program product that implements the subject matter described herein may be located on a single device or computing platform or may be distributed across multiple devices or computing platforms.

BRIEF DESCRIPTION OF THE DRAWINGS

Embodiments of the subject matter described herein will now be described with reference to the accompanying drawings, of which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter described herein can be embodied in many different forms, and all such forms are contemplated to be within the scope of what is claimed. Any such form of embodiment can be referred to herein as "logic configured to" perform a described action, or alternatively as "logic that" performs a described action.

The subject matter disclosed herein provides a way to overcome the limitations of the CES and PWE3 implementations. TDM traffic may be terminated within packet network instead of relayed to another TDM network, so that various TDM related services can be provided by a node within the packet network. TDM traffic may be terminated not only on a per DS0 basis, but also as a virtual T1/E1, T3/E3, and the like. Furthermore, an operator may deploy a virtual TDM network without the use of dedicated TDM equipment. Accordingly, telecommunications carriers may seamlessly upgrade their TDM network to a packet network.

Figure 1:
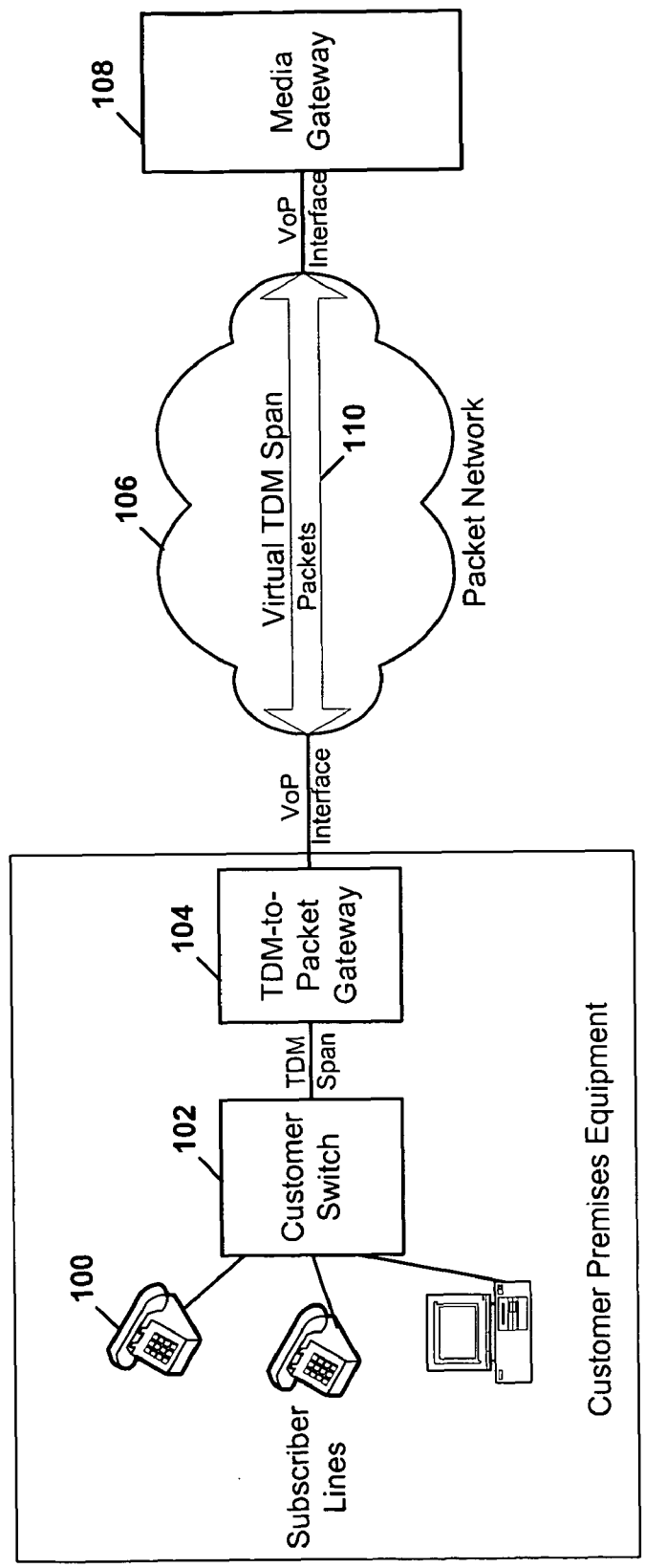
FIG. 1 is a block diagram illustrating an implementation for providing TDM service in a packet network according to an aspect of the subject matter disclosed herein.

FIG. 1 is a block diagram illustrating an implementation for providing TDM terminating service in a packet network according to an aspect of the subject matter disclosed herein. In FIG. 1, subscriber equipment 100, such as telephones, computers, and other communication equipment, is attached to a customer switch 102 at a customer premises. For example, customer switch 102 may be a private branch exchange (PBX). Customer switch 102 processes signals from the subscriber equipment and outputs an associated TDM signal over a TDM span, such as a T1 span. Customer switch 102 may be existing PBX equipment designed to provide, for example, connection to a T1 line for TDM traffic. An on-premise gateway 104 converts the TDM traffic to packets for forwarding over a packet network 106 to a media gateway 108. For example, ATM protocol may be used to packetize the TDM traffic. Alternatively, another packet-based protocol may be employed, such as IP, Ethernet, MPLS, and the like. TDM traffic is segmented, adapted and encapsulated for transport over packet network 106. The TDM traffic is adapted by modifying the payload to accommodate the recovery of TDM signaling and timing. Encapsulation involves placing the adapted payload into packets of the format required by the underlying packet-based protocol.

A virtual TDM span 110 is created between gateway 104 and components within media gateway 108. Unlike previous conventional methods that relay TDM traffic from a first TDM network, to a packet network, and to a second TDM network in order to terminate a TDM span, media gateway 108 terminates the TDM span. Virtual TDM span 110 provides a logical representation of a DS0, T1/E1, or T3/E3, etc., and all associated signaling within the packet network. From the point of view of the customer premises equipment, virtual TDM span 110 is a full TDM facility as would be provided by a TDM network, e.g., it is viewed as a T1 line.

In one implementation, virtual TDM span 110 may be implemented using ATM as the packet network protocol. The ATM protocol provides for a number of adaptation layers in order to support information transfer protocols that are not based on ATM, such as TDM. The main services provided by the adaptation layer are segmentation and reassembly, handling of transmission errors, handling of lost and misinserted cell conditions, and timing and flow control. ATM Adaptation Layer Type 2 protocol (AAL2), defined in ITU-T standard I.363.2, supports time-dependent variable bit rate connection-oriented, synchronous traffic, such as voice over ATM, which will support TDM over ATM. AAL2 provides the capability of multiplexing voice packets from different channels on a single ATM connection. AAL2 operates by buffering each TDM time slot into short, fixed-length packets, referred to as cells, inserting the time slot identifier and length indication, sequencing, and then sending each cell over packet network 106.

In an alternate implementation, virtual TDM span 102 may be implemented using IP as the packet network protocol. IP provides network layer routing of packets across a network. In order to use the IP network to carry the channels of a TDM span, one or more additional protocols may be utilized to provide the required quality of service. For example, MPLS may be used to set up a label switched path across the IP network to carry the TDM span.

Figure 2:
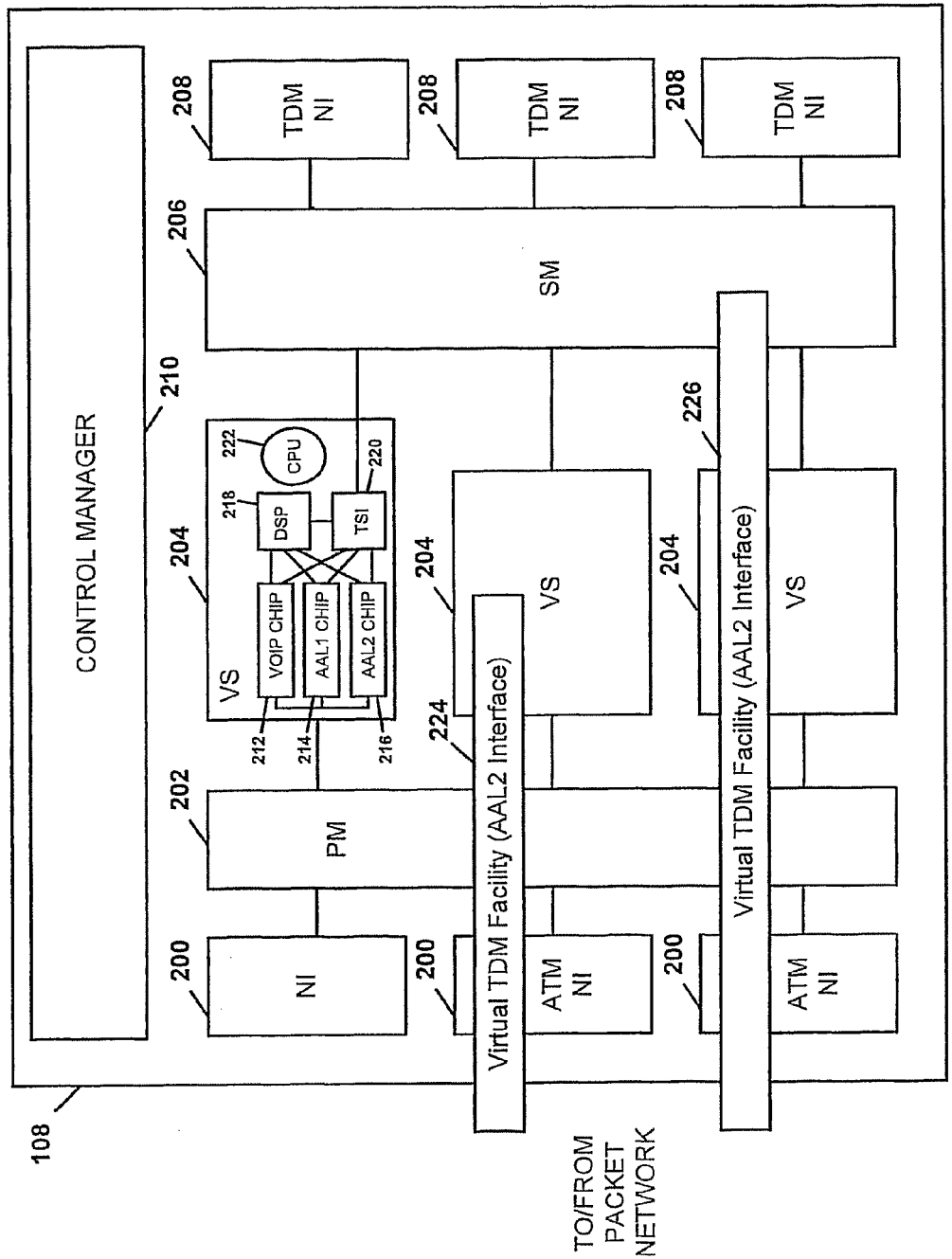
FIG. 2 is a block diagram illustrating an exemplary internal architecture for media gateway in more detail according to an aspect of the subject matter disclosed herein.

FIG. 2 is a block diagram illustrating an exemplary internal architecture for media gateway 108 in more detail according to an aspect of the subject matter disclosed herein. Although a media gateway is described herein by way of example, it should be understood that the methods and systems disclosed herein may be applied to any suitable packet network node. In FIG. 2, media gateway 108 includes packet-based network interfaces (NI) 200, packet matrix (PM) 202, voice servers (VS) 204, a TDM switch matrix 206, TDM network interfaces 208, and a control manager 210. Voice servers 204 include various voice chips, including VoIP chips 212, voice-over-AAL1 chips 214, and voice-over-AAL2 chips 216. In addition, each voice server 204 includes digital signal processors 218 (e.g., voice transcoders, echo cancellers, conference bridges, etc.), a time slot interconnection (TSI) 220, and a central processing unit (CPU) 222.

In the illustrated example, each voice chip 212 implements one or more VoIP protocols, such as Real time Transport Protocol (RTP). Each voice chip 214 implements ATM Adaptation Layer 1 (AAL1) functions. Each voice chip 216 implements ATM Adaptation Layer 2 (AAL2) functions. DSP 218 provides transcoding, echo cancellation and other payload-transformation functions. TSI 220 makes on-demand connections between VoIP chip channels, switch matrix channels, and DSPs. CPU 222 controls the overall operation of each voice server 204.

Each packet-based network interface 200 implements network layer functions and packet processing functions, such as ATM functions or IP functions. In the illustrated example, different network interfaces 200 are provided to connect to, for example, external Ethernet, Packet-Over-SONET (POS), ATM, IP, and MPLS networks. In addition to packet-based network interfaces 200, media gateway 108 may also include TDM network interfaces 208. TDM network interfaces 208 send and receive voice frames from external TDM networks. TDM network interfaces 208 may implement any suitable physical layer protocols for sending and receiving voice frames over TDM links. For example, each TDM network interface 208 may terminate one or more TDM voice trunks. TDM network interfaces 208 are not required for carrying out the virtual TDM facilities described herein, although they may be employed to forward traffic onto a TDM network, for example.

In order to switch media packets between network interfaces 200 and voice servers 204, media gateway 108 includes packet matrix 202. Packet matrix 202 carries packets between network interfaces 200 and voice servers 204. In one implementation, packet matrix 202 may be an Ethernet-based matrix where received packets are forwarded between network interfaces 200 and voice servers 204 in Ethernet frames. Alternatively, packet matrix 202 may be an ATM-based matrix where ATM cells are used to carry information between voice servers 204 and network interfaces 200. Media gateway 108 may also include switch matrix 206 for switching TDM traffic between voice servers 204 and TDM network interfaces 208. Switch matrix 206 is also controlled by control manager 210. Control manager 210 may communicate with a media gateway controller (not shown) to dynamically allocate logical and physical resources of media gateway 108.

As discussed above, conventional methods of providing TDM terminating services over a packet network involve converting from TDM to an associated packet protocol on a channel-by-channel basis, sending the packets over a packet network, and converting the packets back to TDM, once again on a channel-by-channel basis. In contrast, according to the subject matter described herein, it is not necessary to convert packets back to TDM. Instead, TDM traffic may be terminated within the packet network at media gateway 108. All the associated TDM signaling is performed at media gateway 108.

In operation, control manager 210 controls and pre-allocates resources within media gateway 108, such as a voice chip, to provide virtual TDM facilities and carry out TDM-related operations. For example, operations that may be performed by a voice chip may include segmentation and reassembly (SAR), echo cancellation, transcoding, DTMF detection, DTMF generation, announcement, conference bridging, Internet Fax, and ringback functionality. Control manager 210 also allocates AAL2 channels within media gateway 108 to provide virtual TDM functionality. The AAL2 channels may be provisioned for the virtual TDM facilities through a graphical user interface (GUI) in advance of using the facilities to establish voice channels between users. Control manager 210 then allocates the AAL2 channels at a combined TDM channel level, such as DS-1, DS-3, etc. level. For example, control manager 210 may allocate a virtual TDM span 224 including an AAL2 VCC that is carried over ATM network interface 200 and packet matrix 202 and that terminates at one voice server 204. The TDM-related functions described above are handled by voice server 204. Alternatively, control manager 210 may allocate a virtual TDM span 226 including an AAL2 VCC that is carried over ATM network interface 200, packet matrix 202, and one or more voice servers 204, and that terminates in switch matrix 206. The TDM terminating services described above may be handled by voice server 204. Switching of TDM channels may be performed by switch matrix 206 or by a voice server card 204, depending on where the virtual TDM span terminates.

Control manager 210 allocates the AAL2 channels used to implement virtual spans 224 or 226 at a combined TDM DS0 channel level, such as is the case with DS-1, DS-3, etc. In one aspect, PRI signaling over a virtual T1 is supported. For example, 23 64 Kbps bearer (B) channels and one 64 Kbps data (D) channel (23B+D) can be combined, which is equivalent to the 24 channels of a T1 line. The D channel is used to send control signals that can dynamically allocate any number of B channels for different applications. For example, one channel can be allocated for voice, while another can be allocated for data, while six more can be allocated for a videoconferencing channel and so on. In another aspect, CAS signaling may also be supported in which signaling information is carried within the voice channels of a T1 line (in band) rather than on a separate control channel.

Figure 3:
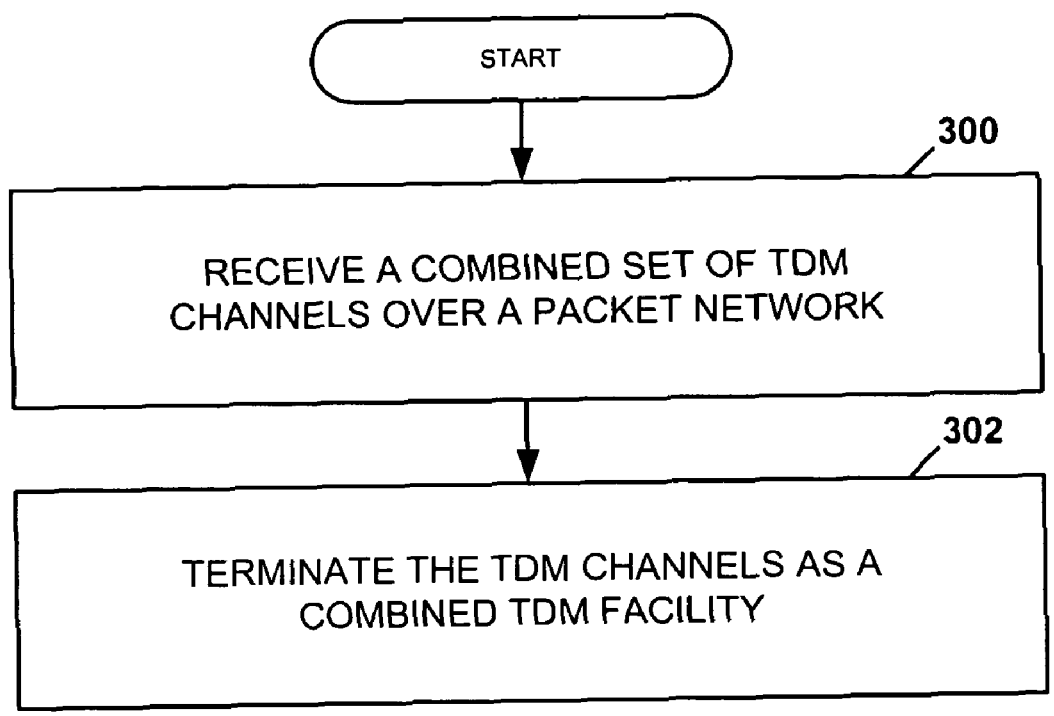
FIG. 3 is a flow diagram illustrating a method for providing TDM service in a packet network according to an aspect of the subject matter disclosed herein.

FIG. 3 is a flow diagram illustrating a method for providing TDM service in a packet network according to an aspect of the subject matter disclosed herein. The steps illustrated in FIG. 3 may be performed at a media gateway or at any suitable packet network node. In step 300, a combined set of TDM channels is received over a packet network. For example, the combined set of TDM channels may be a T1 or higher span packetized according to a packet protocol, such as ATM, IP, Ethernet, and the like. In step 302, the received TDM channels are terminated at media gateway 108 as a combined TDM facility and at least one terminating TDM service is provided.

For example, if a T1 span is terminated, media gateway 108 may perform transcoding, CAS signaling, or other terminating TDM service for a span. In another example, the terminating TDM service provided by media gateway 102 may include performing PRI signaling for a primary rate ISDN span. Because terminating TDM services are provided, at the packet network on a per span basis, the need for expensive real TDM facilities and long haul spans is reduced.

Although the examples described above relate primarily to providing TDM terminating services in a packet network for TDM channels that originate at a customer switch as electrical signals, the subject matter described herein is not limited to such examples. For example, the subject matter described herein may be used to provide TDM terminating services for TDM channels that originate at a customer switch as optical signals. In such an example, TDM-to-packet gateway 104 may convert an optical signal, such as an OC-n or STM-n signal, where n is an integer of at least one, into a packetized format (e.g., IP or ATM format) suitable for transmission over virtual TDM span 110. Media gateway 108 and more particularly one or more voice servers 204 may terminate the virtual TDM span as a combined facility at the OC-n or STM-n level.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for providing terminating time division multiplex (TDM) service in a packet network, comprising:
    at a media gateway in a packet network,
    (a) receiving a combined set including a plurality of TDM channels over the packet network; and
    (b) terminating the TDM channels as a combined TDM facility, wherein terminating the TDM channels as a combined TDM facility includes terminating the TDM channels on a per span basis, wherein terminating the TDM channels as a combined TDM facility includes providing, at the media gateway, at least one terminating TDM service for the TDM channels, wherein terminating the TDM channels includes terminating the TDM channels in the packet network rather than relaying the TDM channels through the packet network to a TDM network to receive TDM terminating service, and wherein terminating the TDM channels includes allocating a virtual TDM span to carry the TDM channels in the media gateway.

2. The method of claim 1 wherein receiving a combined set of TDM channels over a packet network includes receiving a combined set of TDM channels over an IP network.

3. The method of claim 1 wherein receiving a combined set of TDM channels over a packet network includes receiving a combined set of TDM channels over an ATM network.

4. The method of claim 1 wherein terminating the TDM channels as a combined facility includes terminating the TDM channels at a Tn level, where n is an integer of at least one.

5. The method of claim 1 wherein terminating the TDM channels as a combined facility includes terminating the TDM channels at an En level, where n is an integer of at least one.

6. The method of claim 1 wherein terminating the TDM channels as a combined facility includes terminating the TDM channels at an optical carrier-n (OC-n) level, n being an integer of at least one.

7. The method of claim 1 wherein terminating the TDM channels as a combined facility includes terminating the TDM channels at a synchronous transfer module-n (STM-n) level, n being an integer of at least one.

8. The method of claim 1 wherein providing at least one terminating TDM service includes performing transcoding for the TDM channels.

9. The method of claim 1 wherein terminating TDM channels includes providing primary rate interface (PRI) signaling for the TDM channels.

10. The method of claim 1 wherein providing at least one terminating TDM service includes performing channel associated signaling (CAS) for the TDM channels.

11. A system for providing terminating TDM services in a packet network, the system comprising:
    a media gateway located in a packet network that includes:
    (a) a packet network interface for receiving a TDM facility including a plurality of TDM channels transmitted over the packet network; and
    (b) a voice server module for receiving the TDM facility from the packet network interface and for terminating the TDM facility, wherein terminating the TDM facility includes terminating the TDM channels on a per span basis, wherein terminating the TDM facility includes providing at least one terminating TDM service, wherein terminating the TDM facility includes terminating the TDM facility at the voice server module in the packet network rather than relaying the TDM facility through the packet network to a TDM network to receive TDM terminating service, and wherein terminating the TDM channels includes allocating a virtual TDM span to carry the TDM channels in the media gateway.

12. The system of claim 11 wherein the packet network interface comprises an IP network interface.

13. The system of claim 11 wherein the packet network interface comprises an ATM network interface.

14. The system of claim 11 wherein the TDM facility comprises a Tn facility, n being an integer of at least one, and wherein the voice server module is adapted to terminate the Tn facility at a Tn level.

15. The system of claim 11 wherein the TDM facility comprises an En facility, n being an integer of at least one, and wherein the voice server module is adapted to terminate the En facility at an En level.

16. The system of claim 11 wherein the TDM facility comprises an optical carrier-n (OC-n) facility, n being an integer of at least one, and wherein the voice server module is adapted to terminate the OC-n facility at an 0° C.-n level.

17. The system of claim 11 wherein the TDM facility comprises a synchronous transfer module-n (STM-n) facility, n being an integer of at least one, and wherein the voice server module is adapted to terminate the TDM facility at an STM-n level.

18. The system of claim 11 wherein the voice server module is adapted to perform transcoding for the TDM facility as a terminating TDM service.

19. The system of claim 11 wherein the voice server module is adapted to provide primary rate interface (PRI) signaling for the TDM facility as a terminating TDM service.

20. The system of claim 11 wherein the voice server module is adapted to perform channel associated signaling (CAS) for the TDM facility as a terminating TDM service.

21. A computer program product comprising computer executable instructions embodied in a non-transitory computer-readable medium for performing steps comprising:
    at a media gateway located in a packet network that includes:
    (a) receiving a combined set including a plurality of TDM channels over the packet network; and
    (b) terminating the TDM channels as a combined TDM facility, wherein terminating the TDM channels as a combined TDM facility includes terminating the TDM channels on a per span basis, wherein terminating the TDM channels as a combined TDM facility includes providing, at the media gateway, at least one terminating TDM service for the TDM channels, wherein terminating the TDM channels includes terminating the TDM channels in the packet network rather than relaying the TDM channels through the packet network to a TDM network to receive TDM terminating service, and wherein terminating the TDM channels includes allocating a virtual TDM span to carry the TDM channels in the media gateway.

22. The computer program product of claim 21 wherein receiving a combined set of TDM channels over a packet network includes receiving a combined set of TDM channels over an IP network.

23. The computer program product of claim 21 wherein receiving a combined set of TDM channels over a packet network includes receiving a combined set of TDM channels over an ATM network.

24. The computer program product of claim 21 wherein terminating the TDM channels as a combined facility includes terminating the TDM channels at the Tn level, where n is an integer of at least one.

25. The computer program product of claim 21 wherein terminating the TDM channels as a combined facility includes terminating the TDM channels at the En level, where n is an integer of at least one.

26. The computer program product of claim 21 wherein terminating the TDM channels as a combined facility includes terminating the TDM channels at an optical carrier-n (OC-n) level, n being an integer of at least one.

27. The computer program product of claim 21 wherein terminating the TDM channels as a combined facility includes terminating the TDM channels at a synchronous transfer module-n (STM-n) level, n being an integer of at least one.

28. The computer program product of claim 21 wherein providing at least one terminating TDM service includes performing transcoding for the TDM channels.

29. The computer program product of claim 21 wherein terminating TDM channels includes providing primary rate interface (PRI) signaling for the TDM channels.

30. The computer program product of claim 23 wherein providing at least one terminating TDM service includes performing channel associated signaling (CAS) for the TDM channels.

* * * * *